United States Patent

Leistenschneider

Patent Number: 5,017,847
Date of Patent: May 21, 1991

[54] METHOD AND APPARATUS FOR ADAPTING THE SENSITIVITY OF A SENSOR SYSTEM FOR THE DETECTION OF PRECIPITATIONS DURING THE CONTROL OF WIPING INTERVALS OF A SCREENWIPER

[75] Inventor: Raimund Leistenschneider, Merzig-Besseringen, Fed. Rep. of Germany

[73] Assignee: Mercedes-Benz AG, Fed. Rep. of Germany

[21] Appl. No.: 561,349

[22] Filed: Aug. 1, 1990

[30] Foreign Application Priority Data

Aug. 8, 1989 [DE] Fed. Rep. of Germany ....... 3926175

[51] Int. Cl.$^5$ .............................................. H02P 7/00
[52] U.S. Cl. ............................. 318/443; 318/DIG. 2; 15/250 C
[58] Field of Search ................. 318/443, 444, DIG. 2, 318/483, 480, 282–286; 15/250.12, 250.13, 250.17, 250 C

[56] References Cited

U.S. PATENT DOCUMENTS

| | | | |
|---|---|---|---|
| 4,317,073 | 2/1982 | Blaszkowski | 318/483 |
| 4,355,271 | 10/1982 | Noach | 318/480 |
| 4,389,603 | 6/1983 | Kogawa et al. | 318/444 |
| 4,527,105 | 7/1985 | Shiraishi | 318/444 |
| 4,584,508 | 4/1986 | Kobayashi et al. | 318/483 |
| 4,636,698 | 1/1987 | Leclercq | 318/443 |
| 4,689,535 | 8/1987 | Tsunoda et al. | 318/443 |
| 4,705,998 | 11/1987 | Millerd et al. | 318/444 |
| 4,859,867 | 8/1989 | Larson et al. | 318/DIG. 2 |
| 4,916,374 | 4/1990 | Schierbeek et al. | 318/483 |

FOREIGN PATENT DOCUMENTS

| | | |
|---|---|---|
| 0115338 | 1/1984 | European Pat. Off. |
| 2630470 | 12/1978 | Fed. Rep. of Germany |
| 3442948 | 5/1986 | Fed. Rep. of Germany |
| 3538553 | 5/1987 | Fed. Rep. of Germany |

OTHER PUBLICATIONS

SAE Technical Paper Sries 851637—"An Intermittent Wiper System with a Raindrop Sensor"—Passenger Car Meeting, Dearborn, Michigan, Sep. 23-26, 1985.

Primary Examiner—William M. Shoop, Jr.
Assistant Examiner—A. Jonathan Wysocki
Attorney, Agent, or Firm—Evenson, Wands, Edwards, Lenahan & McKeown

[57] ABSTRACT

A method and device for adapting the sensitivity of a sensor system for the detection of precipitations during the control of wiping intervals of a screenwiper drive of a motor vehicle as a function of the kinetic energy of striking precipitations. A pressure-sensitive sensor of a sensor system detects striking precipitations, the detections of striking precipitations are converted into electrical output signals, and the output signals are transmitted via a transmission path to an amplifier with an amplification factor for activating a wiper-motor control circuit. The electrical properties of the transmission path are varied as a function of ambient temperature such that the responsiveness of the sensor system is increased with decreasing temperatures, so that a reliable response even to snowflakes of small mass are achieved.

13 Claims, 1 Drawing Sheet

METHOD AND APPARATUS FOR ADAPTING THE SENSITIVITY OF A SENSOR SYSTEM FOR THE DETECTION OF PRECIPITATIONS DURING THE CONTROL OF WIPING INTERVALS OF A SCREENWIPER

BACKGROUND AND SUMMARY OF THE INVENTION

The present invention relates to a method and apparatus for adapting the sensitivity of a sensor system for the detection of precipitations during the control of wiping intervals of a screenwiper drive of a motor vehicle as a function of the kinetic energy of striking precipitations detected by a pressure-sensitive sensor of a sensor system and converted into electrical output signals, with the output signals of the sensor being sent via a transmission path to an amplifier with an amplification factor for the purpose of activating a wiper-motor control circuit.

With a known automatic control of motor vehicle screenwiper systems, such as described in SAE Paper 85 1637, the wiping intervals are adjusted continuously between 0 and 20 seconds. The vehicle user can switch the automatic interval mode on and off by means of the screenwiper control switch. The sensor system of this control, received in a housing and arranged on the outer surface of a motor vehicle, consists of a vibratory plate, a piezoelectric element fastened to this vibratory plate and a signal amplifier.

The piezoelectric element converts the kinetic energy of precipitations striking the vibratory plate into pulse-shaped electrical voltage signals which are amplified. Noise fractions are filtered out, for example by means of a band-pass filter. The voltage pulses are finally fed to an integrating capacitor, the output of which is connected to an input of a voltage comparator. When the output voltage of the capacitor reaches the value of the reference voltage of the comparator, the comparator transmits a control pulse to the interval control unit. The control unit thereupon activates the screenwiper drive motor in a known manner by means of a square-wave pulse.

The control pulse of the comparator is simultaneously used as a discharge pulse for the capacitor. The wiping intervals become shorter, the more quickly the capacitor is recharged, i.e. the higher the electrical voltage generated by the sensor unit.

A basic frequency of approximately 3 intervals per minute is maintained, even without precipitations, in the "AUTOMATIC" position of the control switch. This frequency is controlled by a constant-current circuit connected in parallel to the sensor unit at the capacitor input. The vibratory plate is damped against high-frequency vibrations of the vehicle body by rubber elements.

The kinetic energy of striking precipitations is dependent on the mass of the drops and on the impact speed. In order to obtain the same wind conditions on the sensor unit as on the windscreen, it must be mounted in a region where a positive dynamic pressure prevails, even at a high driving speed.

The vehicle speed influences the impact intensity of precipitations, the SAE Paper mentioned above stating that the kinetic energy of precipitations is approximately dependent on the third power of the driving speed. A compensation for the vehicle speed is therefore necessary. In the known control, this is provided by a specific empirically determined angle of incidence of the vibratory plate of 15° relative to the horizontal.

A system similar to that described above is also known from European Patent EP 0,115,338 A2.

Another device for controlling wiping intervals is known from German Patent Document DE 2,630,470 A1. This control uses a capacitive moisture sensor, the signals of which are intended to serve not only for detecting the density of striking precipitations, but also for determining the intensity of these precipitations. In this known control, the intensity of the precipitations is detected selectively by a differentiated surface structure of the sensor itself, which produces sensor output signals differing according to the different drop volumes or drop impact forces, or by an electrical evaluation of the levels of the sensor signals amplified in a pulse amplifier.

The purpose of such a detection of the intensity of striking precipitations is, in a sudden cloudburst, to obtain a quick reaction of the screenwiper drive and ensure a corresponding control of the spacing of the individual wiping cycles, that is to say of the wiping intervals.

The arrangements described above neglect an essential factor, namely the adaptation of the sensor systems to changes in the weight of individual particles of precipitation as a function of the temperature, especially around the freezing point. As is known, the weight of snowflakes is greater at temperatures above the freezing point ("wet snow") than at lower temperatures. Although a precipitation sensor of the above-described types responds reliably to "wet snow", because of their low weights, a similarly heavy fall of snowflakes at temperatures below freezing point does not load the sensor to such an extent that wiping operations can be triggered by means of the sensor's signal, even though the view of the vehicle driver is already being impeded, for example by snowflakes melting on the windscreen.

There is a known arrangement for controlling a screenwiper system (German Patent Document DE 3,538,553 A1), in which a moisture sensor is used and in which measures are taken to compensate the effects of fluctuations in the ambient temperature on the reliability of the arrangement. With these measures, which are merely intended to prevent a faulty triggering of wiping cycles at different temperatures of a measurement zone of the moisture sensor and of a reference measurement zone, it is not possible to obtain a controlled temperature-dependent change in the responsiveness of a sensor system having a pressure-sensitive sensor.

In a further known screen-cleaning device (German Patent Document DE 3,442,948 A1), the pressure force of the screenwipers can be varied by a pressure spring consisting of a material changing its spring rigidity and/or its geometry under temperature changes, in that the temperature of the pressure spring is adjusted according to the pressure force required at different vehicle speeds.

Neither of these documents provide a controlled temperature-dependent change in the responsiveness of a sensor system having a pressure-sensitive sensor.

An object of the invention is, therefore, to provide a method by which the sensitivity of a known sensor system to the particular driving and environmental conditions, especially to the ambient temperature, is improved, and to provide a device for carrying out this method.

This and other objects are achieved by the present invention which provides a method of adapting the sensitivity of a sensor system for the detection of precipitations during the control of wiping intervals of a screenwiper drive of a motor vehicle as a function of the kinetic energy of striking precipitations. The method comprises the steps of detecting striking precipitations with a pressure-sensitive sensor of a sensor system, converting the detections of striking precipitations into electrical output signals, transmitting the output signals via a transmission path to an amplifier with an amplification factor for activating a wiper-motor control circuit, and varying the electrical properties of the transmission path as a function of ambient temperature such that the responsiveness of the sensor system is increased with decreasing temperatures.

The objects described above are also achieved by a device constructed according to an embodiment of the present invention for controlling wiping intervals of a screenwiper drive of a motor vehicle. The device comprises a sensor system, this sensor system detecting striking precipitations and converting detected kinetic energy of the striking precipitations into electrical output signals. The sensor system includes a pressure-sensitive sensor, a transmission path coupled to the sensor and carrying the electrical output signals, and an amplifier coupled to the transmission path, this amplifier amplifying the electrical output signals. The device also includes a wiping-interval control unit coupled to the sensor system, an interval time of the wiping-interval control unit being variable by the sensor system as a function of the kinetic energy of striking precipitations. The invention includes means for changing the total electrical resistance of the transmission path between the sensor and the amplifier as a function of ambient temperature. In certain embodiments of the invention, the means for changing the total electrical resistance of the transmission path reduces the total electrical resistance of the transmission path with falling ambient temperatures and increases the total electrical resistance of the transmission path with rising ambient temperatures.

By the method according to the invention and the device for carrying it out, the wiping-interval function is improved and it becomes possible for the sensor system to differentiate between the various precipitated bodies. Especially during the processing of temperature and driving-speed information, the sensor system is adapted as closely as possible to the particular driving conditions. Thus, wiping operations of a motor-vehicle screenwiper system controlled by a sensor are initiated reliably even as a result of the impact of snowflakes at temperatures below the freezing point.

Other objects, advantages and novel features of the present invention will become apparent from the following detailed description of the invention when considered in conjunction with the accompanying drawings.

DETAILED DESCRIPTION OF THE DRAWINGS

Figure 1:
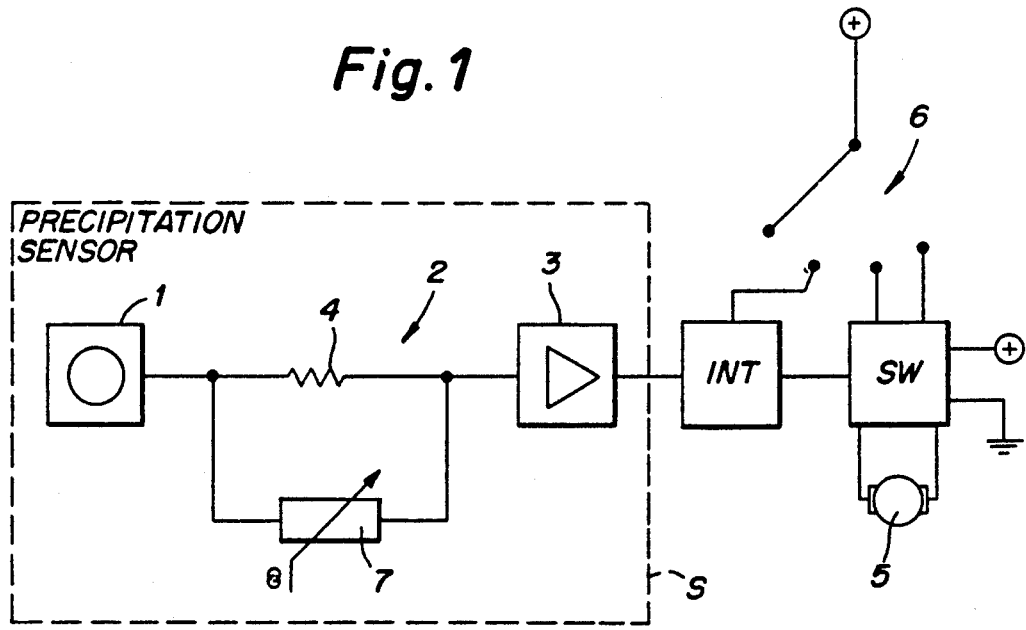
FIG. 1 shows a device constructed according to an embodiment of the present invention for adapting the sensitivity of a sensor system.

In a sensor system S shown in FIG. 1, an impact-sensitive precipitation sensor 1 of any type is connected to an amplifier 3 via a transmission path 2. The transmission path 2 has internal damping represented symbolically by an ohmic resistor 4. The output of the amplifier 3 is coupled to a wiping-interval control unit INT, merely indicated diagrammatically, of a motor-vehicle screenwiper system SW with a motor 5 and with a manually switchable control switch 6.

The total resistance of the transmission path 2 comprises its internal damping and an electrical resistor 7 arranged parallel to this and variable as a function of the ambient temperature $\Theta$. The electrical resistor 7 has a higher resistance value at higher temperatures than at low temperatures, so that the total resistance of the transmission path falls and rises with the ambient temperature $\Theta$. The result of this is that the output signals of the sensor 1 are damped to a lesser extent at low temperatures than at higher temperatures, and therefore the sensor system can respond reliably even to precipitations with small individual masses, especially snowflakes.

Any component for which the characteristics (resistance or voltage behavior) changes in response to temperature variations, for example NTC or PTC resistors or thermo-couples, is suitable for use as the resistor 7.

Figure 2:
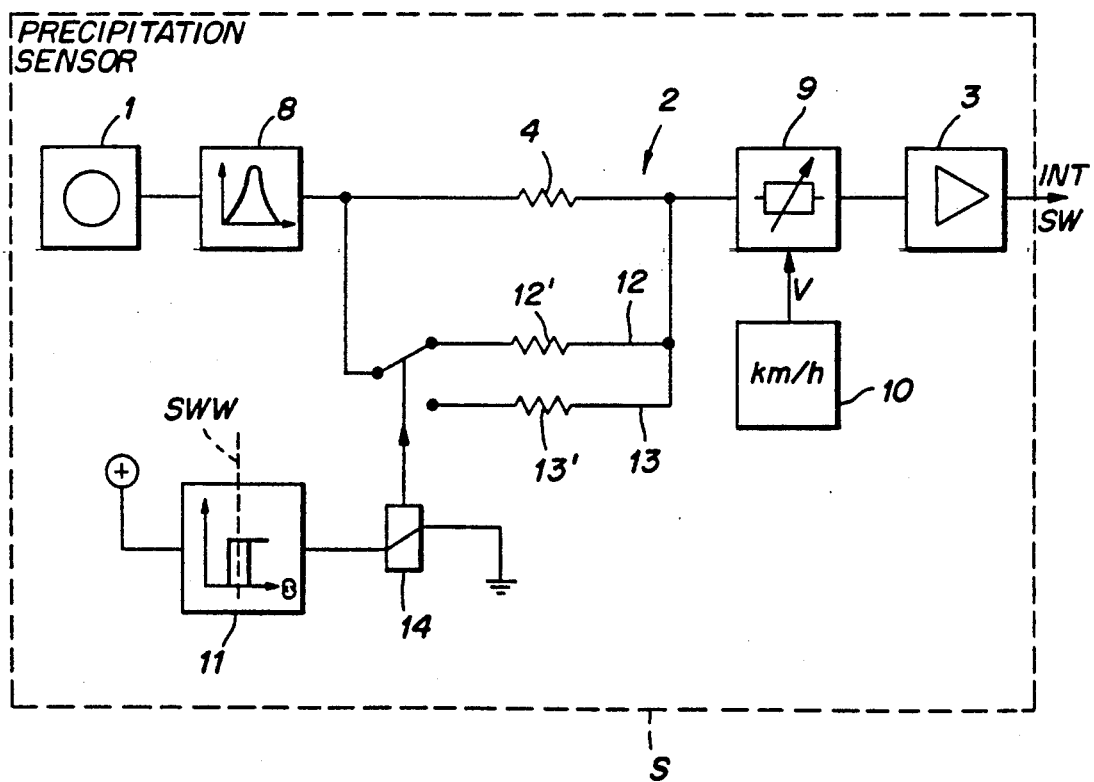
FIG. 2 shows another embodiment according to the present invention of a device with a modified processing of the temperature information and including driving-speed information in the adaptation of the sensor system.

Another embodiment of a device constructed according to the present invention is shown in FIG. 2. In this embodiment, a band pass 8 and a processing circuit 9 for driving speed signals v generated by an electronic speedometer 10 are also provided in the transmission path 2. The band pass 8 serves merely for filtering out the static load exerted on the precipitation sensor 1 by the relative wind. The processing circuit 9 causes the responsiveness of the sensor system to be reduced at higher driving speeds by increasing the total resistance of the transmission path 2, and to be increased at low driving speeds by reducing the total resistance of the transmission path 2. Thus, the higher relative speed between precipitations and a vehicle travelling fast and the resulting higher kinetic energy of the precipitations striking the sensor 1 are taken into account by the present invention.

The speed signals v of the speedometer 10, that is to say, for example, a voltage, a current or a frequency, are supplied to the processing circuit 9. The characteristics of the electronic component used as the processing circuit 9 should change as a function of the magnitude of the signals supplied. Such an electronic component can be, for example, a conventional varistor or optocoupler, of which the luminous intensity variable with the current flowing through is evaluated by a suitable receiver.

As a modification of the embodiment shown in FIG. 1 which provides a temperature adaptation, the embodiment according to FIG. 2 uses a threshold switch 11, of which the switch point or threshold value SWW is set around the freezing point, with a low hysteresis. Instead of the resistor of FIG. 1 that is variable as a function of temperature, two junction segments 12 and 13 with different electrical resistances 12' and 13' are used here. A change-over device 14 is controlled by the threshold switch 11 and connects to the transmission path 2 the junction segment 12 with the lower resistance 12' at an ambient temperature $\Theta$ lying below the threshold value SWW and the junction segment 13 with the higher resistance 13' at an ambient temperature Θ lying above the threshold value SWW. This switching arrangement allows for the fact that the ambient temperature Θ acts on the mass of individual particles of precipitation only in direct proximity to the freezing point.

The evaluation and processing of the output signals of the amplifier are not the subject of the present invention, and so are not described here. However, appropriate evaluation and processing techniques are already known in the prior art, such as that described in European Patent 115,338. The adaptation of the amplifier input signals has an effect on the output signals in that with low sensitivity, that is to say a high total resistance of the transmission path 2, a short interval time is set only in the event of very heavy precipitation, whereas with a low total resistance even only a relatively small impact energy on the precipitation sensor 1 triggers wiping operations and causes a reduction of the interval time.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of adapting the sensitivity of a sensor system for the detection of precipitations during the control of wiping intervals of a screenwiper drive of a motor vehicle as a function of the kinetic energy of striking precipitations, comprising:
   detecting striking precipitations with a pressure-sensitive sensor of a sensor system;
   converting the detections of striking precipitations into electrical output signals;
   transmitting the output signals via a transmission path to an amplifier with an amplification factor for activating a wiper-motor control circuit; and
   varying the electrical properties of the transmission path as a function of ambient temperature such that the responsiveness of the sensor system is increased with decreasing temperatures.

2. The method of claim 1, wherein the responsiveness of the sensor system is increased in one step as the ambient temperature passes downwardly through a value of approximately the freezing point.

3. The method of claim 2, further comprising reducing the responsiveness of the sensor system with an increasing vehicle speed.

4. The method of claim 1, wherein the responsiveness of the sensor system is continuously increased with decreasing temperatures and is continuously decreased with rising temperatures.

5. The method of claim 4, further comprising reducing the responsiveness of the sensor system with an increasing vehicle speed.

6. A device for controlling wiping intervals of a screenwiper drive of a motor vehicle, comprising:
   a sensor system, said sensor system detecting striking precipitations and converting detected kinetic energy of the striking precipitations into electrical output signals, said sensor system including: a pressure-sensitive sensor, a transmission path coupled to the sensor and carrying said electrical output signals, and an amplifier coupled to the transmission path, said amplifier amplifying the electrical output signals;
   a wiping-interval control unit coupled to the sensor system, an interval time of the wiping-interval control unit being variable by the sensor system as a function of the kinetic energy of striking precipitations; and
   means for changing the total electrical resistance of the transmission path between the sensor and the amplifier as a function of ambient temperature.

7. The device of claim 6, wherein the means for changing the total electrical resistance of the transmission path reduces the total electrical resistance of the transmission path with falling ambient temperatures and increases the total electrical resistance of the transmission path with rising ambient temperatures.

8. The device of claim 7, wherein the means for changing the total resistance of the transmission path is an electrical resistor in the transmission path and which has a resistance that varies as a function of temperature.

9. The device of claim 8, further comprising means for increasing the total resistance of the transmission path with decreasing driving speed and for decreasing the total resistance of the transmission path with increasing driving speed.

10. The device of claim 9, wherein the means for increasing the total resistance of the transmission path with decreasing driving speed and for decreasing the total resistance of the transmission path with increasing driving speed includes a varistor that changes its resistance as a function of output signals from an electronic speedometer.

11. The device of claim 7, wherein the means for changing the total resistance of the transmission path includes:
   a threshold switch that switches at a predetermined value of the ambient temperature;
   a change-over device coupled to and switchable by the threshold switch; and
   at least two electrical junction segments with different electrical resistances coupled to the change-over device, said change-over device: switching the electrical junction segment having a higher electrical resistance into the total resistance of the transmission path when the ambient temperature is above said predetermined value; and switching the electrical junction segment having a lower electrical resistance into the total resistance of the transmission path when the ambient temperature is below said predetermined value.

12. The device of claim 11, further comprising means for increasing the total resistance of the transmission path with decreasing driving speed and for decreasing the total resistance of the transmission path with increasing driving speed.

13. The device of claim 12, wherein the means for increasing the total resistance of the transmission path with decreasing driving speed and for decreasing the total resistance of the transmission path with increasing driving speed includes a varistor that changes its resistance as a function of output signals from an electronic speedometer.